(12) United States Patent
Buckner et al.

(10) Patent No.: US 10,395,556 B2
(45) Date of Patent: Aug. 27, 2019

(54) KIT FOR ASSEMBLING PLANAR LED LIGHTING DEVICE

(71) Applicant: PROGRESSIVE ARTS ALLIANCE, INC, Cleveland, OH (US)

(72) Inventors: Lauren Ainsley Buckner, Cleveland, OH (US); Benjamin H. Horvat, Lakewood, OH (US)

(73) Assignee: Progressive Arts Alliance, Cleveland, OH (US)

( * ) Notice: Subject to any disclaimer, the term of this patent is extended or adjusted under 35 U.S.C. 154(b) by 0 days.

(21) Appl. No.: 15/448,075

(22) Filed: Mar. 2, 2017

(65) Prior Publication Data

US 2018/0253993 A1 Sep. 6, 2018

(51) Int. Cl.
| | | |
|---|---|---|
| *F21L 4/00* | (2006.01) | |
| *G09B 23/18* | (2006.01) | |
| *G09B 19/00* | (2006.01) | |
| *G09B 5/02* | (2006.01) | |
| *A63H 33/26* | (2006.01) | |
| *F21Y 115/10* | (2016.01) | |

(52) U.S. Cl.
CPC .......... *G09B 23/181* (2013.01); *A63H 33/26* (2013.01); *G09B 5/02* (2013.01); *G09B 19/003* (2013.01); *F21Y 2115/10* (2016.08)

(58) Field of Classification Search
CPC .. F21Y 2105/10; F21Y 2105/14; F21L 4/027; F21V 15/012; F21V 33/0032; G09F 13/04; G09F 13/08; G09F 2013/0454; G09F 23/04; A47G 1/0622; A57G 1/0638
See application file for complete search history.

(56) References Cited

U.S. PATENT DOCUMENTS

| | | | | |
|---|---|---|---|---|
| 944,744 A | * | 12/1909 | Pine .................... | G09F 23/04 40/323 |
| 2,403,491 A | * | 7/1946 | Bogia .................. | A47G 1/0638 40/753 |
| 2,885,166 A | * | 5/1959 | Lehni .................. | G09F 1/12 248/490 |
| 3,383,503 A | * | 5/1968 | Montgomery ..... | A44C 15/0015 362/104 |
| 3,508,041 A | * | 4/1970 | Sweany ............. | A44C 15/0015 24/66.8 |
| 3,541,714 A | * | 11/1970 | Lester, Jr. ............ | A47G 1/0638 40/759 |
| 3,665,628 A | * | 5/1972 | Dammond ........... | A47G 1/0638 40/790 |
| 3,981,091 A | * | 9/1976 | Wiener, Jr. .......... | A47G 1/0638 40/791 |
| 4,271,457 A | * | 6/1981 | Martin ............... | A44C 15/0015 200/61.52 |
| 4,459,645 A | * | 7/1984 | Glatter ............... | A44C 15/0015 174/50.55 |
| 4,638,409 A | * | 1/1987 | Berman ................. | F21L 15/06 362/103 |

(Continued)

*Primary Examiner* — Ismael Negron

(74) *Attorney, Agent, or Firm* — Hudak, Shunk & Farine Co. LPA

(57) ABSTRACT

A kit includes front and back planar members each having receptacle notch, a generally U-shaped clip configured to mate with the receptacle notches to secure the front and back planar members together, at least one LED, a battery, and a plurality of conductive tapes.

6 Claims, 4 Drawing Sheets

(56) References Cited

U.S. PATENT DOCUMENTS

| | | | | |
|---|---|---|---|---|
| 4,692,846 | A * | 9/1987 | Johnson | F21L 2/00 |
| | | | | 362/104 |
| 4,719,544 | A * | 1/1988 | Smith | A44C 15/0015 |
| | | | | 362/104 |
| 4,912,608 | A * | 3/1990 | Lee | A44C 15/0015 |
| | | | | 362/104 |
| 5,201,578 | A * | 4/1993 | Westmoland | A44C 15/0015 |
| | | | | 362/104 |
| 5,575,098 | A * | 11/1996 | Goettel-Schwartz | G09F 9/33 |
| | | | | 362/151 |
| 5,755,506 | A * | 5/1998 | Ray | A44C 15/0015 |
| | | | | 362/103 |
| 6,430,858 | B1 * | 8/2002 | Andre | A47G 1/0622 |
| | | | | 362/812 |
| 6,659,617 | B1 * | 12/2003 | Michael | A44C 15/0015 |
| | | | | 315/76 |
| 7,290,714 | B2 * | 11/2007 | Halbur | G06Q 30/0239 |
| | | | | 235/487 |
| 8,152,326 | B2 * | 4/2012 | House | B65D 3/22 |
| | | | | 362/154 |
| 9,192,255 | B2 * | 11/2015 | Burrous | A47G 1/0622 |
| 2002/0040541 | A1 * | 4/2002 | Wang | A47G 1/0622 |
| | | | | 40/714 |
| 2015/0313381 | A1 * | 11/2015 | Chen | A47G 1/0622 |
| | | | | 40/417 |

* cited by examiner

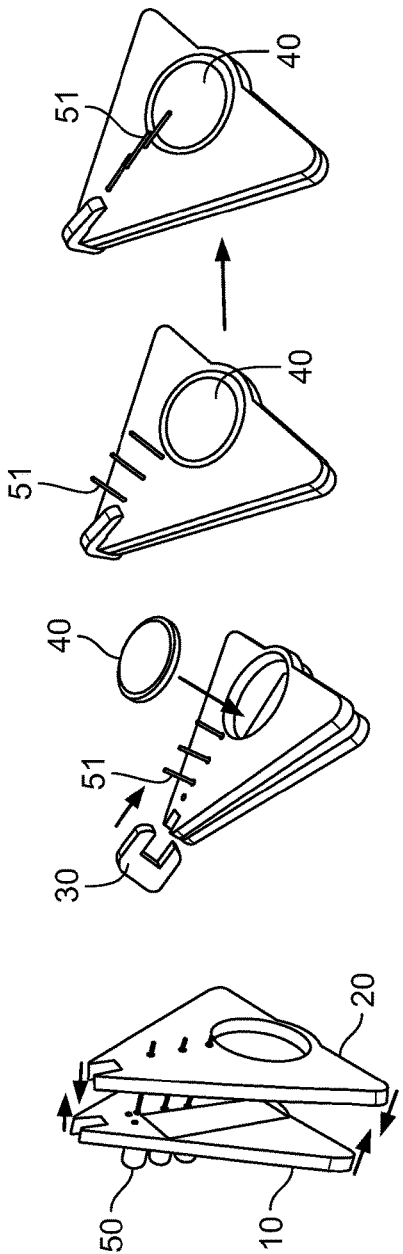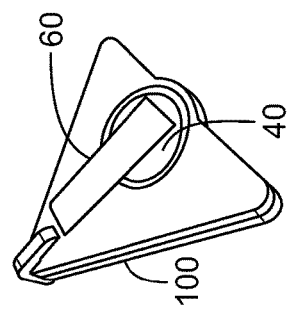

KIT FOR ASSEMBLING PLANAR LED LIGHTING DEVICE

FIELD OF THE INVENTION

The invention generally relates to component kits for educational purposes, particularly battery-powered LED lighting kits useful for teaching grade school children the principles of batteries and of electricity.

SUMMARY OF THE INVENTION

The following is a summary of some aspects and exemplary embodiments of the present technology, of which a more detailed explanation is provided under the Detailed Description section, hereinbelow.

Exemplary embodiments of the present kit are designed to stimulate creativity, to teach some of the basic principles of electricity and to teach fine motor skills. For example, the kit may be used to teach principles about batteries and diodes, particularly the principle about diodes that only allow for the flow of current in one direction. The kit may also be used to teach about the principles of electrical polarity applicable to both batteries and diodes. The kits may be useful as a stimulating "toy" for children to develop creativity and motor skills, and for a host of other purposes, too numerous to detail, only limited by the imagination.

An exemplary embodiment provides a kit for assembly of a variety of shaped components into a three dimensional lighted work. The kit includes a plurality of selected components that once assembled create a lightable LED plaque that may be used as a badge or worn as an adornment or simply used as a hand held light. As one embodiment the kit includes somewhat flexible front and back planar members useful in mounting and supporting the LEDs, battery and other components. The front and back planar members may be made of any suitable material, but preferred materials are non-conducting. The front and back planar members may be made of conducting material, so long as the electrical circuit is isolated therefrom, by the use of a suitable non-conducting wrap. The most preferred material for the front and back planar members is acrylic. The kit included a generally u-shaped clip that mates with a receptacle notch in the front and back planar members to slidably and securably connect at the notched portion of the front and back planar members in order to secure the front and back planar members together. The u-shaped clip may be made of any suitable material, but preferred materials are non-conducting. The most preferred material is acrylic. The kit also includes LED lights, battery and conductive tape useful in making the electrical connections necessary to complete an electrical circuit and to get the LED lights to work.

The selected shaped components may optionally be transparent or translucent, and the kit includes light emitting diodes (LEDs) which may be of any available color. The shaped front and back planar components may have any shape, geometric or otherwise. For this particular embodiment discussed and exemplified in the Figures herein, a roughly triangular shape for these components was selected, but as one skilled in the art would appreciate, almost any shape may be used as long as the relevant holes (for the LED connections and the battery) and notches (for the secure connection) are included in the shapes. Optionally, the plurality of components of the exemplary kit may be white, and the kit also may include coloring materials, in a variety of colors, suitable for applying color to the plurality of shaped components. The kit may also include decorative elements that may be added to the device, such as cotton or polyester fibers, to cover and to mute or soften somewhat, but not completely obscure the LED lights when lit.

BRIEF DESCRIPTION OF THE FIGURES

Advantages of embodiments to the present invention will be apparent from the following detailed description of the embodiments hereof, which description shall be considered in conjunction with the accompanying drawings in which:

FIG. 5 is a view of the fourth assembly steps of the kit.
FIG. 6 is a view of the fifth assembly step of the kit.
FIG. 7 is a view of the sixth assembly step of the kit.
FIG. 8 is a view of the seventh assembly step of the kit.
FIG. 9 is a view of the eighth assembly step of the kit.

DETAILED DESCRIPTION OF THE INVENTION

Aspects of the invention are disclosed in the following description and related drawings directed to specific embodiments of the invention. Alternative embodiments may be devised without departing from the spirit or the scope of the invention. Additionally, well-known elements of exemplary embodiments to the invention will not be described in detail or will be omitted so as not to obscure the relevant details of the invention.

Figure 1:
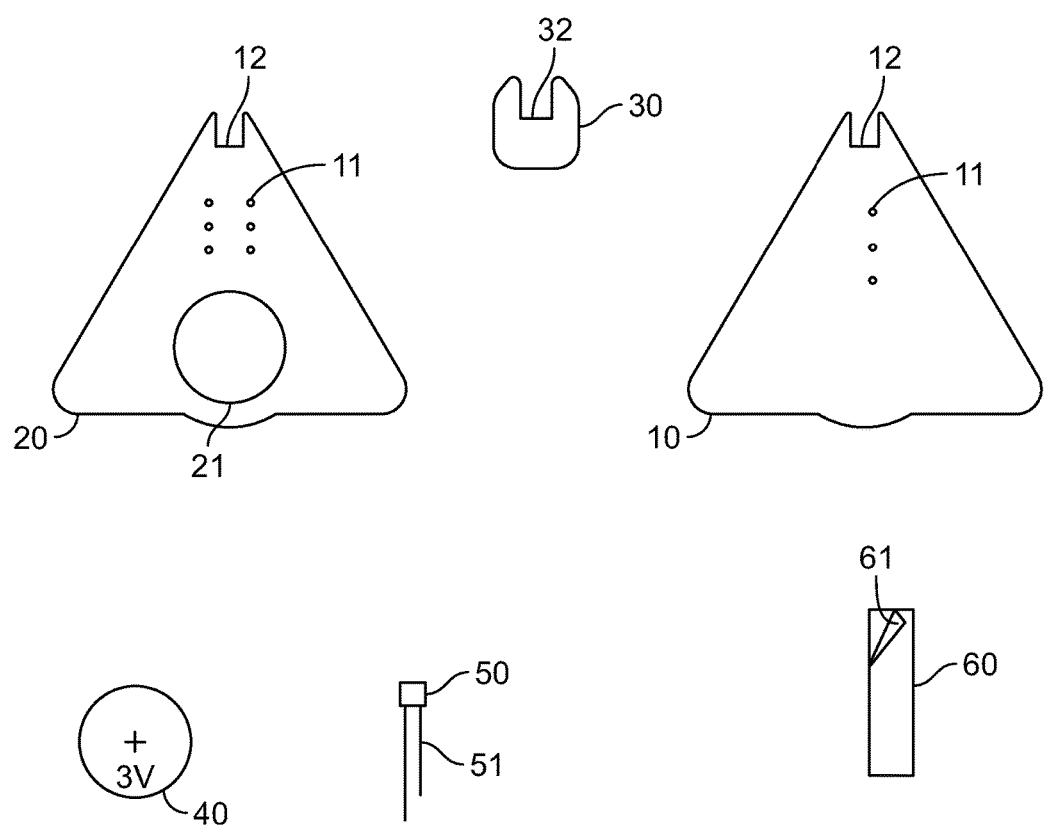
FIG. 1 is a front view of the exemplary components of the LED kit.

With references to the figures, FIG. 1 is a view of the exemplary components of the LED kit of the instant invention. Front planer member 10 contains passageways 11 for conductors 51 of LED light 50. LED light 50 has two contacts, by definition polar contacts, a positive normally longer contact or conductor 51 and a shorter, negative conductor 51. Connector receptacle 12 on both front (10) and back (20) planar members is shaped to slidably engage, to accept and to lock with U-shaped connecting clip 30. Back planer member 20 also contains passageways 11 for conductors 51 of LED light 50. Back planer member 20 also contains a receptacle 21 which is designed to accept and securably hold battery source 40. Connecting clip 30 contains connector receptacle 32 utilized in slidably engaging and securably connecting at the connector receptacle 12 of both the back planer member 20 and front planer member 10. Connecting clip 30 is used to slidably engage and securably connect the back planer member 20 with front planer member 10.

Figure 11:
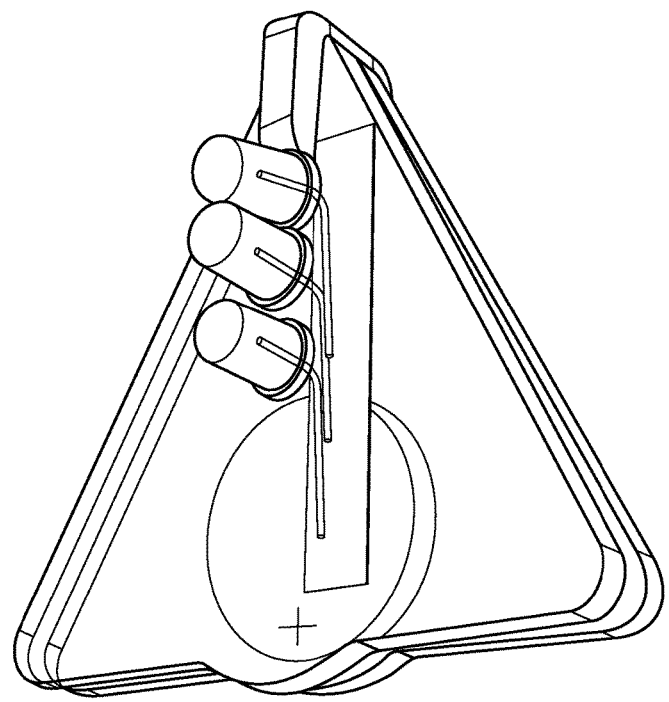
FIG. 11 is a view of the final assembled kit of the instant invention.

The kit includes battery source 40 as well as LED lights 50 with polar connectors 51. The LED light kit further includes 2 pieces of connective adhesive tape having peel-off adhesive portions (61) as well as connective tape portions 60. FIG. 11 is provided for illustrative purposes to show a completed LED kit.

Figure 2:
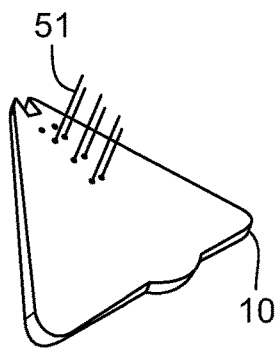
FIG. 2 is a view of the first assembly steps of the kit.
Figure 3:
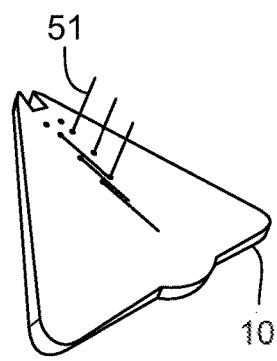
FIG. 3 is a view of the second assembly step of the kit.
Figure 4:
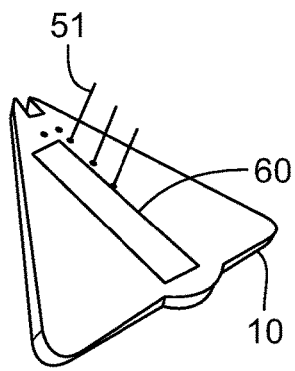
FIG. 4 is a view of the third assembly step of the kit.

Further, with reference to the figures, FIGS. 2-4 show views of the first three assembly steps of the kit of the instant invention. As is well known with respect to LED kits, the electrical polarity of a light emitting diode only allows current to flow in a single direction. Therefore, while positive and negative terminals are described in the instant invention, it is well known that the polarities must be associated with and matched with the polarity of battery source 40 for current to flow through the diode and for the diode to light as a light emitting source.

As show in FIG. 2, the front planer member 10 has 6 passageways 11 for the conductors 51 of the LED lights 50. In the assembly process, the LED light connectors are passed through passageways 11 of the front side of front planer member. The LED components are also aligned in a way that the polarity of each of the lamps is aligned. As shown in FIG. 3, the positive (longer) leads 51 of the LED lights 50 are all bent down in a collinear fashion and along the plane of the front planer member 10 and become coplanar therewith. As shown in FIG. 4, the positive leads of the 3 LED light connectors 51 are attached and electrically connected using the adhesive conductive strip 60, with care being taken not to connect the adhesive conductive strip 60 to any of the negative leads 51 of the LED lights 50 that remain unbent.

As shown in FIG. 5, planer front member 10 containing the LED lamps 50 is brought into an adjacent position with back planer member 20, with the remaining negative leads 51 of the LED lamps 50 allowed to pass through passageways 11 of the back planer member 20. As shown in FIG. 6, connecting clip 30 is used to securely connect front planer member 10 with back planer member 20. Battery source 40 is securably placed within the receptacle for battery 21 in back planer member 20. As shown in FIG. 7, the negative leads of the LED lamp which extend through the backside of back planer member 20 are now bent in a colinear fashion along the face of back planer member 20 as shown in FIG. 8. As shown in FIG. 9, a second conductive adhesive tape 60 is then added to back planer member 20 to securably connect all negative leads 51 of LED lamps 50 with the battery source 40 (negative contact).

Figure 10:
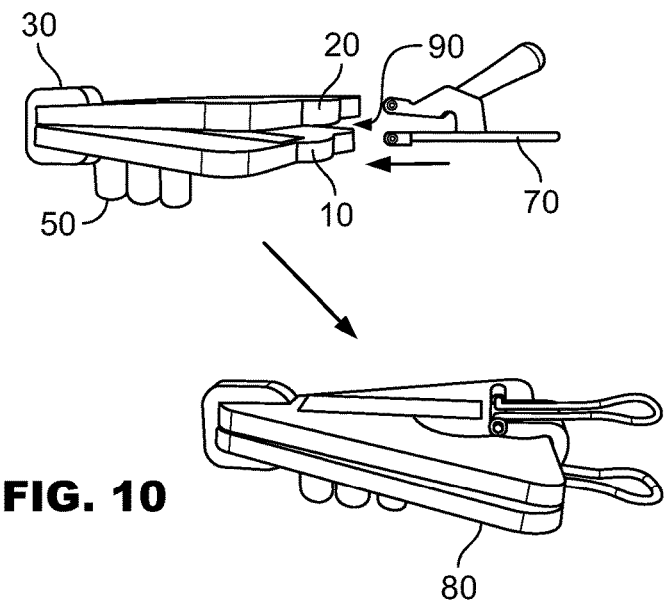
FIG. 10 shows the final assembly step of the instant invention.

FIG. 10 demonstrates the operation of the LED kit once assembled. The use of the connective adhesive tape 60 with the positive leads in between front planer member 10 and back planer member 20, by their volume, creates a thin gap or void 90 between the two planer surfaces. In order to make a complete electrical circuit that includes the battery source 40 and the LED lamps 50, a binding compressive clip 70 may be used as shown in FIG. 10 to force front planer member having connective strip 60 to flex slightly downward toward back planer member 20, and the connective strip 60 of the front planar member makes electrical contact with the positive terminal of battery source 40 now contained within back planer member 20. In this way, a circuit is completed and the LED lamps light up as shown in FIG. 10. FIG. 11 is an illustration of the completed embodiment of the instant kit invention.

The foregoing description and accompanying drawings illustrate the principles, preferred embodiments and modes of operation of the invention. However, the invention should not be construed as being limited to the particular embodiments described above. Additional variations of the embodiments described above will be appreciated by those skilled in the art. Therefore, the above-described embodiments should be regarded as illustrative rather than restrictive. Accordingly, it should be appreciated that variations to those embodiments can be made by those skilled in the art without departing from the scope of the invention or the spirit of the invention as defined by the following claims.

What is claimed is:

1. A kit for assembling a three-dimensional lighted work, comprising:
   at least two non-conducting planar members, each having a receptacle notch formed as a cut-out extending from one major side surface to the opposite major side surface, said cutout extending in the thickness direction of each planar member;
   a generally u-shaped clip configured to mate with the receptacle notches of the planar members to secure them together;
   a battery;
   at least one battery receptacle formed within one of the planar members, said receptacle extending in the thickness direction of the planar member and having openings on a first face and an opposite second face of said planar member, for accepting and holding the battery such that a positive terminal of the battery is exposed sufficiently to allow electrical contact at said first face of the planar member and a negative terminal of the battery is exposed sufficiently to allow electrical contact at said second face of the planar member;
   at least one LED light having a positive contact and a negative contact;
   and at least one conductive tape for connecting the positive contact of the at least one LED light to the battery and a second conductive tape for contacting the negative contact of the at least one LED light to the battery.

2. The kit of claim 1, wherein the planar members further comprise a plurality of holes configured to receive contacts of the at least one LED light.

3. The kit of claim 1, further comprising a circular or round battery source component, and wherein the battery receptacle is a circular battery receptacle.

4. The kit of claim 1, wherein the planar members are generally triangular in shape.

5. The kit of claim 1, wherein the conductive tape is secured using an adhesive.

6. The kit of claim 1 in which the non-conducting planar members are made of acrylic.

* * * * *